United States Patent
Palmer et al.

(10) Patent No.: US 6,292,166 B1
(45) Date of Patent: Sep. 18, 2001

(54) SYSTEM AND METHOD FOR SHARING DIVERSE DISPLAY TYPES IN A BIT MAP SHARING COLLABORATIVE TOOL

(75) Inventors: Ricky Samuel Palmer; Lawrence George Palmer, both of Nashua, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/956,742

(22) Filed: Oct. 24, 1997

(51) Int. Cl.[7] ....................................................... G09G 5/02
(52) U.S. Cl. ................................................ 345/150; 345/3
(58) Field of Search ................................... 345/1–3, 150, 345/153, 155, 199, 431

(56) References Cited

U.S. PATENT DOCUMENTS

| | | | |
|---|---|---|---|
| 5,430,465 | * 7/1995 | Sabella et al. | 345/150 |
| 5,696,539 | * 12/1997 | Welti et al. | 345/199 |

OTHER PUBLICATIONS

"An X Imaging Server" by Larry Palmer and Ricky Palmer, published Nov. 4, 1987.

* cited by examiner

Primary Examiner—Jeffery Brier
(74) Attorney, Agent, or Firm—Williams, Morgan & Amerson, P.C.

(57) ABSTRACT

A new system for resolving differences in pixel format is disclosed for use in a collaborative software tool. The disclosed system further determines a frequency distribution of color values within pixels forming a bit map of the display of the shared region on the server system. The disclosed system further forms a color ramp responsive to the frequency distribution of color values. The color ramp includes a number of color ramp entries, where each one of the color ramp entries includes an output color value associated with one or more input color values. The color ramp is then transmitted to a client system. The client system converts pixels received from the server system based on the contents of the color ramp. Further in the example embodiment, the client system converts pixels received from the server system using a color conversion table generated based on the color ramp if the pixels in the client system are of true color format.

39 Claims, 7 Drawing Sheets

SYSTEM AND METHOD FOR SHARING DIVERSE DISPLAY TYPES IN A BIT MAP SHARING COLLABORATIVE TOOL

FIELD OF THE INVENTION

The disclosed invention relates generally to collaborative software tools and more specifically to a system for sharing graphics information having diverse display types across a computer network.

BACKGROUND

As computer networks, the Internet, and distributed computing have developed, members of project teams have become increasingly able to work from different physical locations. Tools such as electronic mail, notes conferences, the world wide web (WWW) and remote file transfer provide a first level of communication between team members. At times, however, there is required the ability to enable multiple team members at differing physical locations to simultaneously view and/or interact with any computer program or set of data. All participating team members must be able to provide inputs, and see the results of their own and other team members' inputs in real time. Such functionality is provided in general by software products referred to as "collaborative tools".

Existing collaborative tools often employ a protocol level splitting approach in which windowing protocol messages are captured at each client system and sent to a server system. Such existing systems have significant shortcomings. Specifically, in existing collaboration tools, only a single application program may be shared at one time. Existing collaborative tools also only permit sharing of two dimensional graphics applications between users having two dimensional graphics display devices. Accordingly, existing collaborative tools are incapable of conveniently sharing two and three dimensional graphics applications between users on both two and three dimensional graphics display devices. In addition, existing collaborative tools do not permit sharing of any partial displays of shared applications. Instead, existing systems require a single shared application to be completely displayed to each client.

Moreover, where a collaborative tool is made available, its potential users may not all be working from exactly the same hardware or software display technology. Different display technology may use different formats of pixels. For example, different users may have pixel formats which use different numbers of bits for color information, and which use the color information in each pixel in different ways. Accordingly any new collaborative tool which shares information based on pixels must provide some way to resolve the differences between the pixel formats used on diverse systems.

Thus, it is desirable to have a collaborative tool which allows multiple users on systems using differing pixel formats to share information across a network. Such a new system should advantageously permit multiple application programs to be shared simultaneously, and allow two and three dimensional graphics information to be shared with users on both two and three dimensional display devices, and enable team members to share partial displays of application windows.

SUMMARY OF THE INVENTION

A new system for resolving differences in pixel format is disclosed for use in a collaborative software tool. In a first aspect, the disclosed system determines a frequency distribution of color values within pixels forming a bit map of the display of the shared region on the server system. The disclosed system further forms a color ramp responsive to the frequency distribution of color values. The color ramp includes a number of color ramp entries, where each one of the color ramp entries includes an output color value associated with one or more input color values. The color ramp is then transmitted to a client system. The client system converts pixels received from the server system based on the contents of the color ramp. Further in the example embodiment, the client system converts pixels received from the server system using a color conversion table generated based on the contents of the received color ramp.

Thus there is disclosed a system which allows multiple users on systems using differing pixel formats to share information across a network. The disclosed system advantageously permits multiple application programs to be shared simultaneously, and allows two and three dimensional graphics information to be shared with users on both two and three dimensional display devices, and enables team members to share partial displays of application windows.

DETAIL DESCRIPTION OF THE PREFERRED EMBODIMENTS

Figure 1:
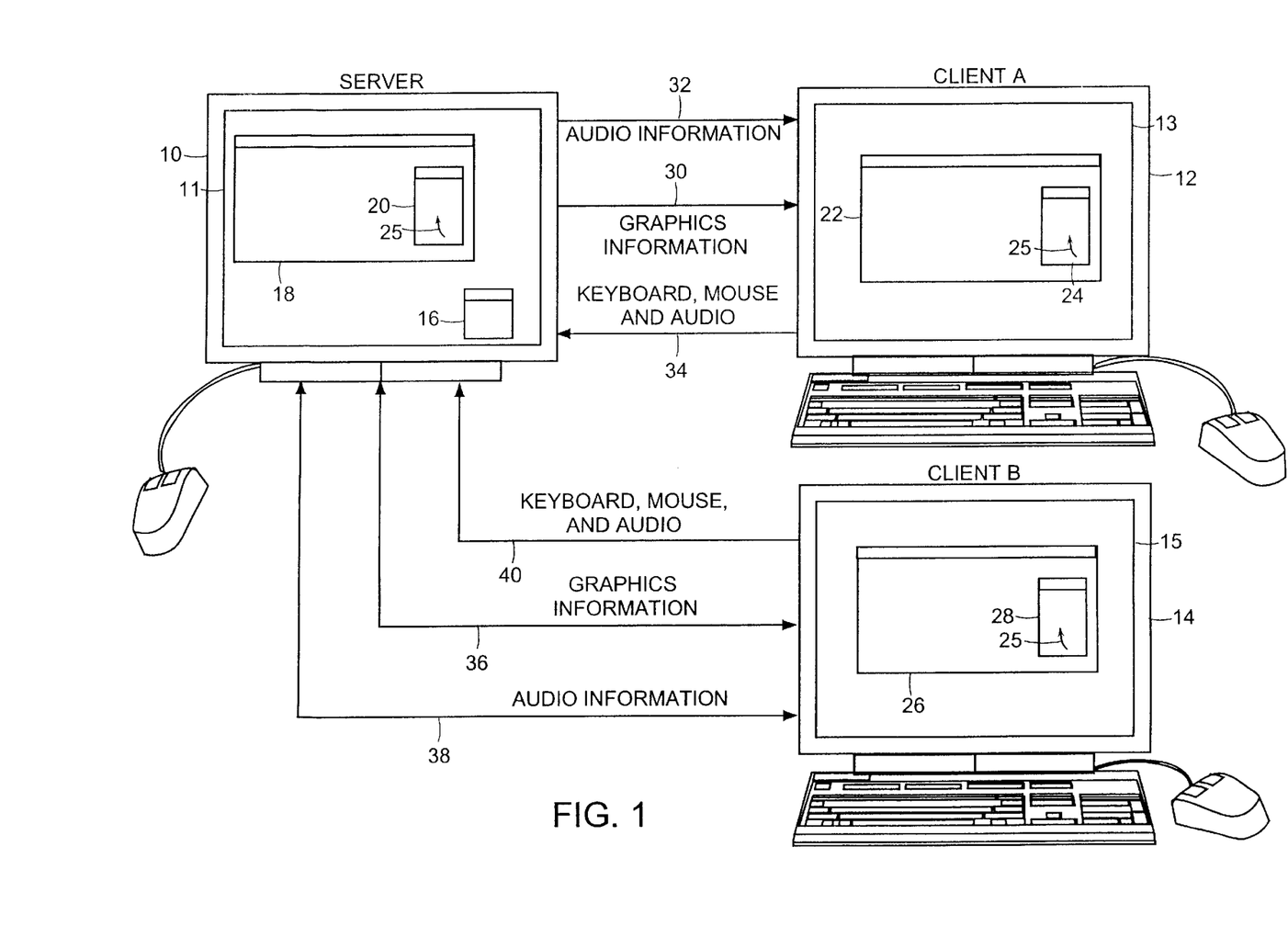
FIG. 1 is a block diagram showing a server and two client systems in an example embodiment.

FIG. 1 is a block diagram showing a server 10, and two client systems—client A 12 and client B 14. Server 10, for example is connected with the two client systems via a conventional computer network (not shown). Each of the server 10, client A 12, and client B 14 are for example computer workstations or personal computers including conventional hardware components (not shown), such as a microprocessor, memory, secondary storage and various peripheral and I/O devices. I/O devices for example include keyboard, mouse and other user interface devices.

The server 10 is shown including a display screen 11, having on it displayed a shared region 18, having within it a shared application window 20. Further shown on the display screen 11 is a server application window 16. The client A 12 is shown including a display screen 13 having on it displayed a client application window 22. The client application window 22 includes within it a shared application window 24. The client B 14 is shown including a display screen 15 having on it displayed a client application window 26. The client application window 26 includes within it a shared application window 28. A shared cursor 25 is shown displayed on both the server and client display screens.

During operation of the elements shown in FIG. 1, keyboard, mouse, and audio information 34 is passed from the clients A 12 and B 14 to the server 10. Further, audio information 32 and graphics information 30 are passed from the server 10 to the client A 12 from the server 10 to the client B 14. The graphics information 30 and graphics information 36 is graphical information describing the shared region 18 in the server and is used by client application programs executing on the two client systems to replicate the shared region 18 in the client application window 22 and client application window 26 respectively. In an example embodiment, the graphics information 30 and graphics information 36 represent changes to be made to the client application window 22 and the client application window 26 respectively, in order to match the server application window. For example, the graphics information 30 and graphics information 36 include a compressed and encoded difference matrix, containing ones in all bit locations of the difference matrix corresponding to bits in the client window bit map which must be changed relative to a previous update, in order to match the server application window.

The keyboard and mouse information in the keyboard, mouse and audio information 34 and 40 is used by a server application program executing in the server 10 to update the display of the shared region 18. The shared cursor 25 is moved responsive to movements of the mouse interfaces for the server 10, client A 10 or client B 12, or responsive to any other conventional interface device used to manipulate a cursor. The audio information in the keyboard, mouse, and audio information 34 and 40 is for example received from audio microphones on client A 12 and client B 14 respectively, digitized using hardware in clients A 12 and B 14 and then transmitted to the server 10. The audio information 32 and 38 transmitted by the server 10 to the client systems, is a combination of the audio information received by the server 10 from all of the client systems.

The shared region 18 is formed by the server application executing on the server 10 either by default or responsive to a user request. A shared application program executes for example on the server 10 to form the shared application window. Because the shared application window 20 is within the shared region 18, it is replicated in the client windows on the client systems. Any application windows which are displayed either partly or completely within the shared region 18 are shared between the server 10 and the client systems. If the entire server screen display is shared, for example such that server application window 18 is the same size as the server display screen 11, then all application interfaces present in the server 10 are shared, with the exception of the server application window 16, which remains private to the server 10. While in the example of FIG. 1 two client systems are shown, one skilled in the art will recognize that the disclosed system applies to configurations having other numbers of client systems.

The shared region 18 can be modified in size or location using mouse or keyboard commands issued by a user of the server system 10. As application windows on the display screen 11 are moved into the shared region 18, they become shared with all client systems. Similarly, as the shared region 18 is moved or increased in size to include any application windows in the display screen 11, those application windows become shared with all client systems.

In a first example embodiment, as the shared region 18 is re-sized by the server application responsive to commands from a user of the server system 10, the client application in each client system re-sizes its client window to match the size of the shared region on the server display device. Alternatively, the client application can provide scaling or clipping of the graphics information received from the server 10 in order to display a shared region within a client window having a smaller resolution. Where clipping of the shared region is performed, the client application, for example, may provide scroll bars to enable the client user to scroll through the shared region within the client window.

In the example embodiment of FIG. 1, additional clients can be connected to the shared region by the server application. The server application can disconnect any and all clients from a shared region at any time. The server application window 16 provides a number of controls to the user of the server 10, for example, through a pull-down server interface. These controls include the following:

Connect—causes the server application to form a connection pop-up dialog box, which may then be used to connect a client to the shared region 18 on the server 10.

Move—begins a move operation by the server application of the shared region to a new location within the screen display. The old shared region location is replaced with an outline and redrawn responsive to a mouse click at a new location, relative to the cursor location at the time of the mouse click.

Resize—a resize operation of the shared region. The old shared area is replaced with an elastic outline box, which is modifiable using a mouse to move the cursor. A single mouse click finishes the resize and causes the server application to redraw the shared region to a new size, indicated by the modified position of the elastic outline box.

Disconnect—causes the server application to form a disconnection dialog pop-up box which may be used to disconnect a client from the shared region.

End Session—causes the server application to disconnect all clients from the shared region. In an example embodiment warning messages are sent to client applications connected to the shared region prior to disconnection.

Enable/Disable Remote Cursor—allows or disallows client applications from controlling applications windows within the shared region. When disabled, users of client systems see updates to the shared region in the client windows, but cannot make modifications. In an example embodiment, when remote cursor is enabled, all connected client applications, as well as the server application, are able to modify the position of the cursor in the server and client application windows. In an example embodiment, when all the cursors are within the shared regions on the respective client and server systems, then a user of either the server or a client system can move the cursor. When a client user moves the cursor on a client system outside of the shared window, then all the cursors on the other client systems and the server system stop at the edge of the shared region. If the server user moves the cursor outside of the shared region, that takes control of the cursor away from all of the client systems, and until the server user moves the cursor back within the shared region, the users of the client systems cannot provide mouse input into the shared applications within the shared region.

Save Settings—causes the server application to save the state of applications for later use. Examples of settings which may be saved are size of the shared region, and location of the shared region.

Default Settings—causes the server application to restore applications settings to a predetermined set of default values.

Figure 2:
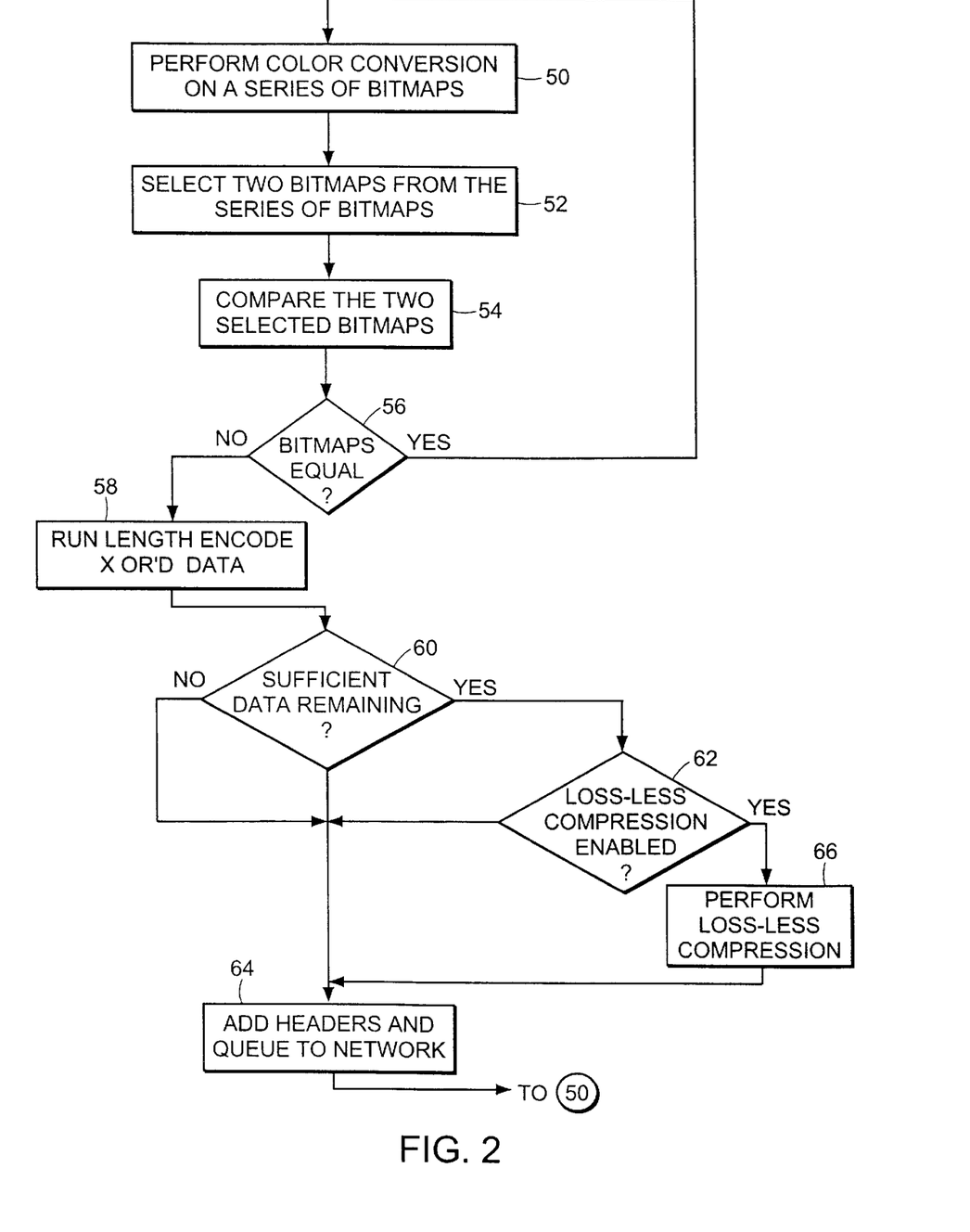
FIG. 2 is a flow chart showing steps performed by a server system in an example embodiment.

The operation of the elements of the example embodiment shown in FIG. 1, will now further be described with reference to FIG. 2. FIG. 2 is a flow chart showing steps performed by an example embodiment of the disclosed server application program.

The server application operates in part by capturing bit maps of information describing the display on the display screen. In an example embodiment, the server application accomplishes this by using a call interface to graphics server software on the server system which returns pixels of information representing the screen display on the server system, including the shared region. Alternatively the disclosed system may read the frame buffer information from a Video RAM (VRAM) which is fed to a RAMDAC to create the display on the display device or read data from a local graphics cache which is used to update the frame buffer or VRAM.

In an example embodiment, where the server system is configured having X-Windows graphics server software, the server application uses the X-Windows call of XshmGetImage( ) to obtain current pixel information reflecting the screen display. Where the server system is configured with the Windows® 95 operating system of Microsoft® Corporation or the like, the server application uses the BITBLT( ) calling interface to obtain the current pixel information. One skilled in the art will recognize that the disclosed system is applicable where other specific methods are used to obtain pixel information representing the current screen display on the server system.

In the disclosed embodiment, the server application uses a polling approach to periodically obtain pixel information describing the screen display on the server system. Alternatively an interrupt driven approach may be employed responsive to changes in the screen display detected by the underlying hardware providing the screen display. The server application in the example embodiment of FIG. 1 obtains pixel information describing the display on the display device periodically. Each such action on the part of the server application is referred to herein for purposes of example as a "frame buffer capture". The rate of frame buffer capture is changed dynamically by the server application responsive to what is changing in the display, whether remote cursor is enabled or disabled, how busy the server system is, and how busy the network or client systems are. The continuing frame buffer captures form a series of bit maps which are processed by the server application. FIG. 2 shows the steps performed by the server application to convert a captured bit map into data suitable for network transmission.

At step 50 in FIG. 2, in an example embodiment for operation in a UNIX™ operating system environment, the server application performs color conversion on each of the captured bit maps. At step 50 the server application modifies the pixel information in each captured bit map to resolve any differences in display depth between application windows within the shared region and the display depth of the root window of the windowing system on the server. To perform this step, the server application maintains an internal database of certain attributes of each window that is at least partially displayed within the shared region. Such maintained attributes for example include (1) the number of bits of color information used in pixels for each window, (2) the stacking order of windows at least partially displayed within the shared region, and (3) the size of each such window. An analogous example of pixel depth conversions performed in the client system to resolve differences in pixel depth is described in connection with FIG. 7. The output of step 50 is a series of bit maps having a common pixel depth, where pixel depth is defined to be the number of bits of color information within each pixel. These bit maps are then referred to for purposes of example herein as "color compensated" bit maps.

In a first example, an application window and the root window both use true color pixel format. For example, where the application window pixel depth is 15, 16, or 24, the pixel depth indicates the pixels are in true color format. Where the root window pixel depth is less than that of the application window, a left shift of a predetermined number of bits is performed on a color component basis within each application window pixel value. For example, if an application window pixel depth is fifteen, having 5 bits each for red, green, and blue, and the root window pixel depth is sixteen, having instead 6 bits for red, a one bit left shift of the red component from the application window pixel value is performed to obtain the expanded 6 bit value for the red component of the output pixel value. Similarly, if the application window pixel depth is sixteen, including a 5 bit field for red, a 5 bit field for blue, and a 6 bit field for green, and the root window pixel depth is twenty-four, having 8 bit fields for each of red, green and blue, a left shift of 3 on each of the 5 bit fields and a left shift of two on the 6 bit field is performed to form the 24 bit output pixel value.

In the case where the application window and root window are of dissimilar pixel type, i.e. pseudo versus true color, the conversion performed is referred to as a "Mixed-Mode" type of conversion. In an example embodiment, pixel values having a predetermined size (for example 8 or 12) are pixel depths for pseudo color pixel formats. Conversion of an application window pixel format to the pixel format of the root window may include an interpretation step using a color map associated with the application window pixel format. A color map in this case is a table indexed by the value of the pseudo color pixels for the application window, which contains values to be sent to the color guns of the display device. For example at step 50 in FIG. 3, an application window using eight or twelve bit pixel values may be present within the shared display region on the server. The server application must accordingly convert the pixel values in areas of the shared region which have a different pixel depth than the root window of the shared region. For example, a shared region having a root window using a twenty-four bit true color pixel depth may include a portion of a shared application window using an eight bit pixel depth. The server application would interpret the eight bit pixels in the shared application prior to any bit map comparisons. For example, each 8 bit input pixel value is converted in the server to a 24 bit value by looking up a corresponding entry in a color map for the application window, for example an entry indexed by the 8 bit input pixel value. The color map entry referenced in this way contains a 24 bit true color value to be substituted for the input 8 bit pixel value.

At step 52, the server application selects two bit maps from the series of color compensated bit maps. The selected bit maps are for example two consecutive bit maps in the series. The selected bit maps are then compared at step 54, for example by use of an exclusive "OR" (XOR) operation to compare the individual bits of the selected bit maps. The output of the XOR operation on the two selected bit maps is a difference array. The difference array (also referred to herein as the "difference matrix") includes set bits in all positions whose values differ between the two selected bit maps.

If the values in the difference array output from step 54 are all zero, then the bit maps are determined to be equal at step 56, meaning that nothing in the shared region has moved or changed between the first selected bit map and the second selected bit map. In that case step 56 is followed by step 50 as there is no need to communicate a redundant shared region to the client applications. If the values in the difference array are not all zero, then step 56 is followed by step 58.

At step 58 the server application performs Run Length Encoding (RLE) on the difference array. The Run Length Encoding performed at step 58 is especially advantageous since often only a small area of the shared region will change between the two selected bit maps. Run Length Encoding further provides for very efficient compression at this stage of the process. A specific example of Run Length Encoding used in an example embodiment of step 58 is described below in connection with FIG. 5.

At step 60 the server application determines whether the data remaining after the Run Length Encoding at step 58 is greater than a predetermined amount. If the remaining data is less than the predetermined amount, then the movement in the shared region is very small. Such a small amount of difference data could actually be expanded by some loss-less compression techniques, and therefore no loss-less compression should be performed. If the remaining data is greater than the predetermined amount, then further compression is performed. In an example embodiment, if the remaining amount of data is 32 words or more, then step 60 is followed by step 62. Otherwise, step 60 is followed by step 64.

If at step 60 it is determined that sufficient data remains to do further compression, step 60 is followed by step 62, at which time the server application determines whether loss-less compression has been enabled. For example the user may enable loss-less compression in an environment in which network bandwidth is relatively scarce or alternatively disable it where the network is fast but local compute resources are scarce. In an example embodiment, loss-less compression is automatically enabled by the disclosed system without user intervention when the server application detects a pre-determined level of network congestion. In an example embodiment, the disclosed system determines network congestion by measuring the round trip propagation through the network between the server and the client systems. This is done for example by the transmitter placing a time stamp in a transmitted message. The receiving station, for example the client system, then returns the message time stamp in an acknowledgment message sent back to the transmitter. The transmitter calculates round trip propagation over the network by the elapsed time since the original transmission. In an example embodiment, the server does not send updated graphics information until an acknowledgment message is received from each client system for the previously transmitted graphics information. In this example embodiment, the time stamps may be returned to the server in the acknowledgment messages from the client systems.

Further in the example embodiment, if the round trip time is measured and determined to be greater than or equal to twice the desired frequency for updating the display of the shared region on the client systems, then loss-less compression is enabled. Where for example the desired update frequency is once every 50 milliseconds, the round trip time is compared with 100 milliseconds, and if greater than or equal to 100 milliseconds, then loss-less compression is enabled. If loss-less compression is enabled, step 62 is followed by step 66. Otherwise step 62 is followed by step 64.

At step 66 loss-less compression is performed on the data. The specific type of loss-less compression is implementation dependent, and conventional types may be employed. In a preferred embodiment, Lempel-Ziv (LZ77) encoding is used to provide the loss-less compression at step 66. Step 66 is followed by step 64. At step 64 the process data is formed into one or more messages, and any necessary application protocol header and network protocol headers are added. The headers include destination address information indicating the client systems. The destination address information is for example in the form of Internet Protocol (IP) address information. The server application includes various information in an application header that is used by the client application to process the received data. For example, timing information to measure round trip propagation delay between transmitter and receiver such as a transmission time stamp to be returned in an acknowledgment message, length of data, pixel format, compression information, as well as information describing the enabling or disabling of various other options may be included in the application header. Timing information in the message header is also available to be used by the receiver to resolve conflicts in mouse event or video information received from multiple nodes. The resulting messages are then for example passed to a communications protocol stack software on the server, for example through conventional socket interfaces to a TCP layer of a TCP/IP protocol stack. The steps shown in FIG. 2 are periodically repeated in order to maintain the display of the shared region on the client systems.

Figure 3:
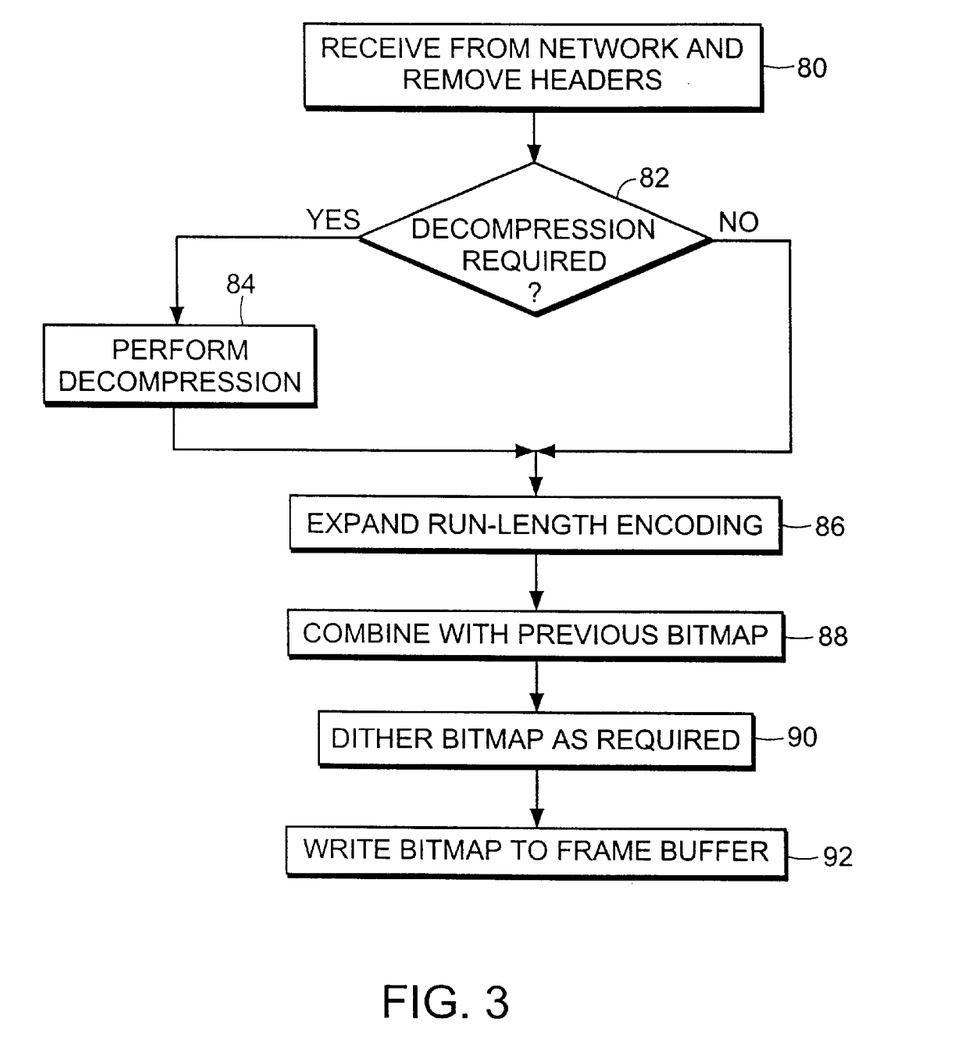
FIG. 3 is a flow chart showing steps performed by a client system in an example embodiment.

FIG. 3 shows the steps performed by the client application in response to receipt of graphics information from the server system. At step 80, the client system receives one or more messages from the interface to the network layer protocol of the communication protocol stack executing on the client system. For example, the client receives one or more messages through a socket interface to the TCP layer protocol of a TCP/IP protocol stack. Further at step 80, the client application removes all headers from the received information and stores any pertinent information from the application header. For example, the application header may include indication from the server application whether the data in the message has been compressed using a predetermined loss-less compression technique.

At step 82, the client application determines whether decompression of the received data is required, for example responsive to information received in the application layer header. If decompression is required, then it is performed following step 82 at step 84. Otherwise, step 82 is followed by step 86. At step 86, the client application expands the run length encoded data. In an example embodiment, the client application expands the run length encoded data by reversing the process described in connection with the steps shown in FIG. 5. At step 88, the client application combines the expanded data with the existing bit map of the client window, for example by performing an XOR with the existing bit map. In this way, the client system forms an updated bit map equal to the second bit map selected at step 52 in FIG. 2. At step 90, the client application performs dithering and scaling as required to resolve differences in pixel depth and display size. For example, dithering is performed at step 90 where the root window of the client has a different pixel depth from the root window in the server. A color conversion table formed based on a color ramp received from the server, having entries indexed by the value of received pixels, and having entry values equal to the corresponding client window pixel values, may be used to perform this step. Alternatively, where true color format pixels are used in both the server and the client, dithering may be performed using a shift operation on the received pixel values. Scaling may for example be performed in the client using an API such as STRCHBLT in the Windows® 95 operating system.

At step 92, the client application writes the resulting bit map into a frame buffer used to generate the screen display on the client system. For example, where the client system includes an X Windows graphics server software module, the client application uses the X Windows XshmPutImage( ) interface to write the bit map. Alternatively, where the client system is running the Windows® 95 operating system, the client application, for example, uses the BITBLT( ) Application Programming Interface (API) to write the bit map.

Figure 4:
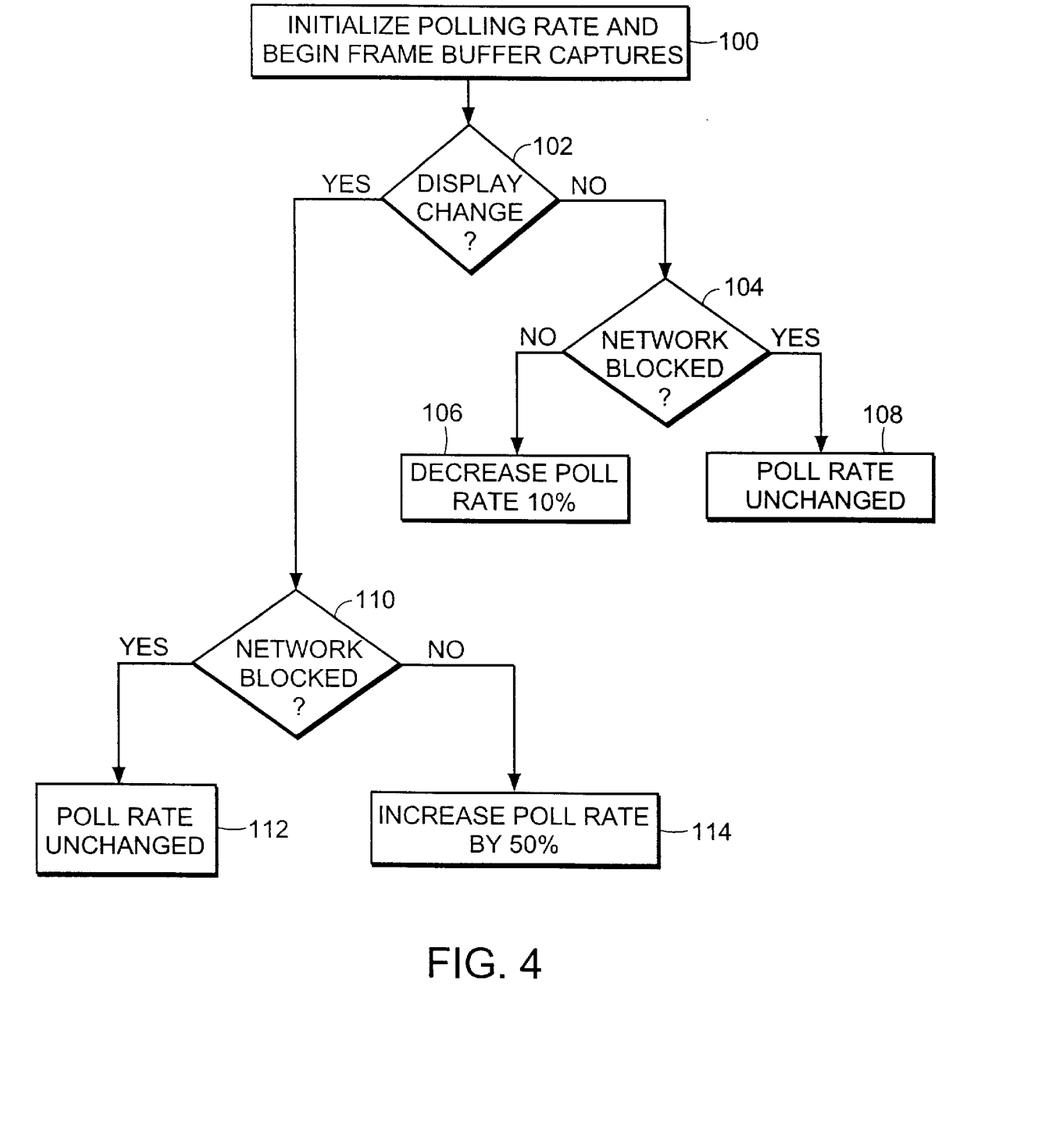
FIG. 4 is a flow chart showing steps performed to set a frame buffer capture rate on the server system in an example embodiment.

FIG. 4 shows an example of steps performed by the server application to set a polling rate for capturing frame buffer contents on the server system. At step 100, the server application initializes the polling rate to a predetermined value and begins periodic capture of the frame buffer. For example, the polling rate is initialized to one capture every fifty milliseconds, giving an update rate of twenty updates per second.

At step 102, the server application determines whether there has been a change in the display of the shared region, for example by comparing a current bit map of the shared region with a previous bit map of the shared region. If the display is determined to have changed, step 102 is followed by step 110. Otherwise, step 102 is followed by step 104. At step 104, the server application determines whether the network connection to one or more of the client systems is blocked, for example because a transmission of a previous update is being performed. The determination at step 110 is for example performed by checking in the server system whether an acknowledgement message has been received from each client with respect to the last graphical update information transmitted. If the network is determined to be blocked at step 110, the polling rate is left unchanged at step 112. If the network is not blocked, the polling rate is reduced at step 114 by a predetermined amount, for example fifty percent. At step 104, the server application determines whether the network is blocked similarly as was determined at step 110. If the network is blocked, at step 108 the polling rate is left unchanged. If the network is not blocked, the polling rate is increased by a predetermined amount, for example, ten percent. Using the system shown in FIG. 4, the server application can quickly increase the polling rate responsive to detecting a quickly changing shared region display. Without the steps shown in FIG. 4, an excessive amount of compute resources on the server system would be used to capture frame buffers.

Figure 5:
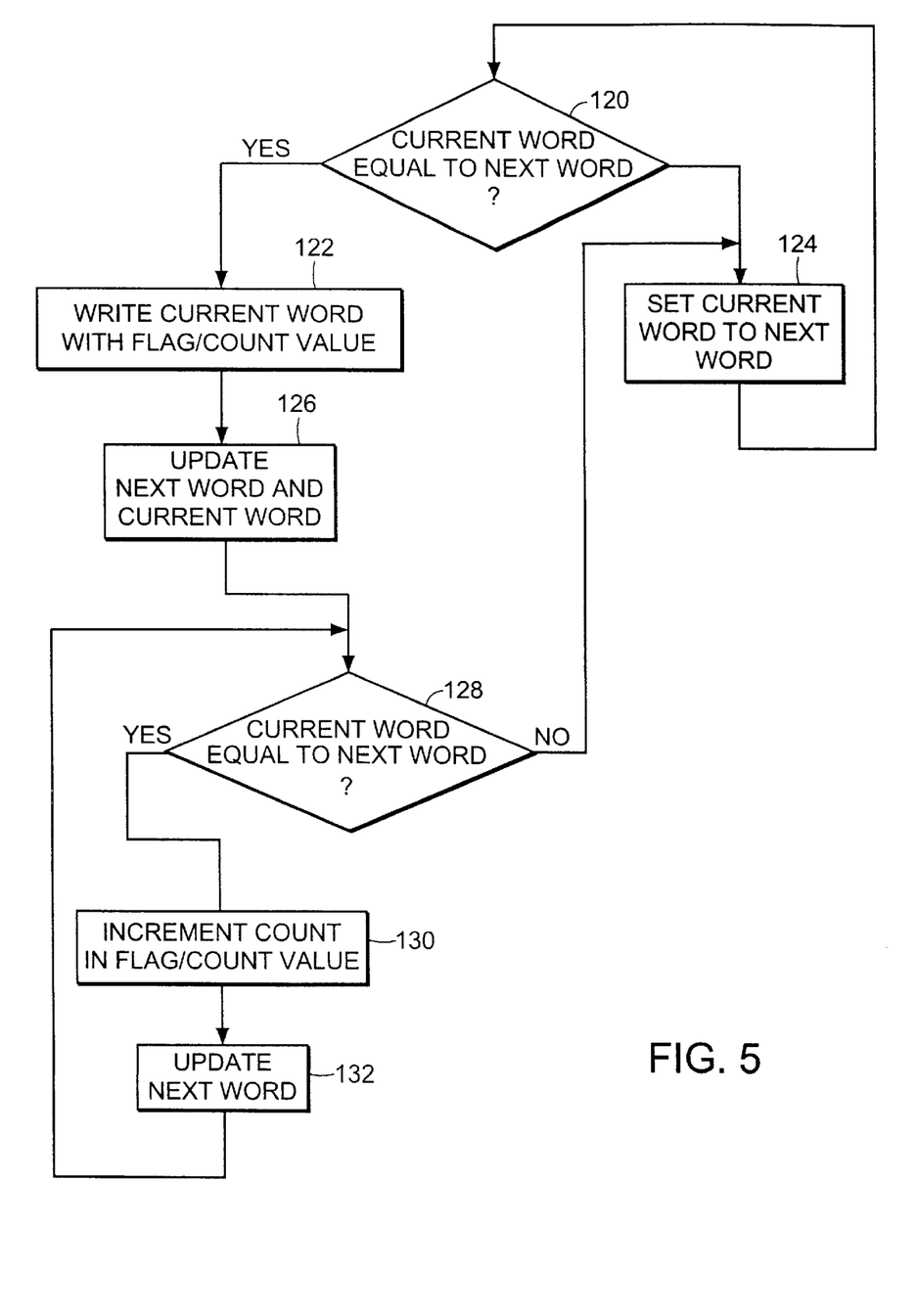
FIG. 5 is a flow chart showing steps performed by the server application to run-length encode a difference matrix in an example embodiment.

FIG. 5 shows steps performed by an example embodiment of the server application program in step 58 as shown in FIG. 2 to Run Length Encode the difference matrix resulting from the comparison of the two frame buffers. In the steps of FIG. 5, the server application treats the difference matrix as a series of data words, each word having a length equal to a predetermined number of bits. In the example embodiment of FIG. 5, the server application uses a word length equal to 64 bits.

At step 120 the server application compares a data word (referred to herein for purposes of example as the "current" word) with a next data word immediately subsequent to that word. For example the server application initially treats the first word of the difference matrix as the current word and the second word of the matrix as the next word. If at step 120 the current word is determined to be equal to the next word step 120 is followed by step 122. Otherwise step 120 is followed by step 124.

At step 124 the server application sets the current word to the next word. For example, where the current word and next word are maintained as pointers, at step 124 the value of the current word pointer is set to the value of the next word pointer. Also at step 124 the next word pointer is set to indicate the word immediately following the word indicated by the new value of the current word pointer. Step 124 is followed by step 120.

At step 122, the server application writes the word indicated by the current word pointer with a flag/count value. The flag/count value includes a flag portion that is a unique constant value. A count portion in the flag/count value indicates the number of words following the word containing the flag/count value which have a common value. For example at step 122 the server application writes a 1 into the value portion of the flag/count assuming one word following the word containing the flag/count value was found to have the same value as the word which the server application overwrote with the flag/count value.

Upon detection of the unique flag value in the received data during expansion of the Run Length Encoding as shown in step 86 in FIG. 3, a client application may determine that the value in the word after the word having the flag/count is a value that is to be replicated in the word having the flag/count value and a number of words following indicated by the count portion of the flag/count value. Step 122 is followed by step 126. At step 126, the server application updates the next word pointer to indicate the word following the word previously indicated by the next word pointer. Also in step 126 the server application updates the current word pointer to indicate the word previously pointed to by the next word pointer. The word containing the flag/count value written in step 122 is for example maintained by a "flag/count word" pointer. Step 126 is followed by step 128.

At step 128 the server application compares the value of the current word with the value of the new next word. If the value of the current word is not equal to the value of the new next word then step 128 is followed by step 124. Otherwise step 128 is followed by step 130. At step 130 the server application increments the count portion of the flag/count value in the flag count word. Step 130 is followed by step 132. At step 132 the next word pointer is updated to indicate the word following the previous word indicated by the next word pointer.

The steps shown in FIG. 5 are repeated until all words in the difference matrix have been checked for adjacent equality. The specific order of steps shown in FIG. 5 is given purely for purposes of example, and one skilled in the art will recognize that other orders may be used consistent with the principles of the disclosed system.

The compression provided by the disclosed system advantageously combines Run Length Encoding with the motion detection provided in FIG. 2 and the loss-less compression described at step 66 of FIG. 2. For example, consider a 1,024 by 768 by 8 bit bit map processed to form a difference matrix at step 54 of FIG. 2. The difference matrix is then passed to the Run Length Encoding step 58. If for example 700,000 of the 800,000 bytes in the difference matrix are unchanged and accordingly set to zero, the steps in FIG. 5 potentially remove those 700,000 bytes and replaces them with two 64 bit words, the first having the flag/count value, and the second having a value of zero. If for example the remaining 100,000 bytes consist of 100 scan lines of 1,000 bytes each, where a scan line is the display information for a single line on the display, and if all scan lines are different but contain the same pixel value repeated, then 1,000 16-byte two-word flag/count-value sequences would result for a total of 1,600 bytes. In this example the original 800,000 bytes of graphics information are reduced to 1616 bytes of Run Length Encoded data for a compression ratio of 500 to 1.

The disclosed Run Length Encoding of FIG. 5 can be efficiently performed without excessive computational requirements. Further in the example embodiment of FIG. 5, the server application detects any matches in the difference matrix to the unique value of the flag/count value. When such a match is found then the matching value in the difference matrix is incremented. The remaining bits in the word within the difference matrix are not modified. In this way the flag portion of the flag/count value is ensured to be unique throughout the run length encoded data.

Figure 6:
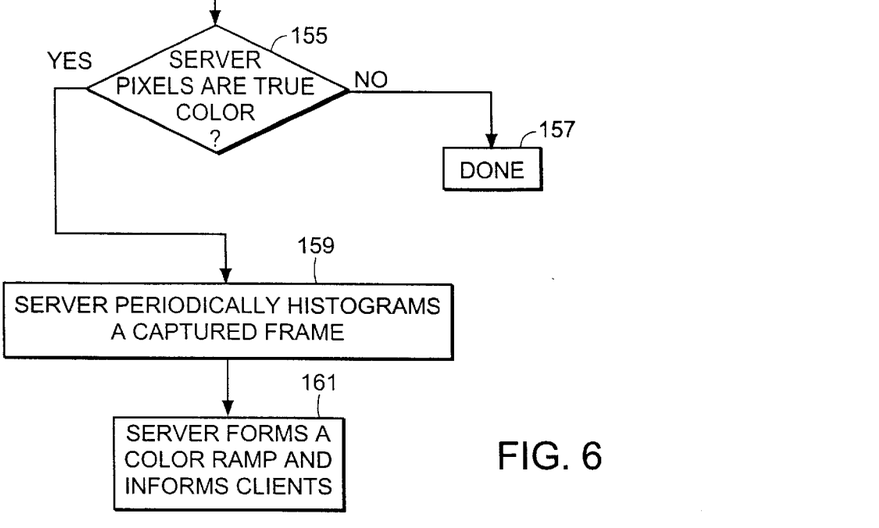
FIG. 6 is a flow chart showing steps in an example embodiment of the disclosed system for forming a color ramp in the server application.

Now with reference to FIG. 6, steps of an example embodiment to form a color ramp are shown. In the example embodiment, the steps shown in FIG. 6 are performed in the server application when the pixel values sent from the server are true color, and the pixel format used for display in the client is pseudo color. At step 155, the example embodiment of the server application determines whether the server pixel format is true color. In the example embodiment, the pixel form is determined to be true color if the pixel depth is greater than or equal to a predetermined value, for example fifteen bits. True color values are displayed by direct conversion to analog values which are sent to the respective color guns in the display device. In the example embodiment, the lowest defined true color pixel depth is fifteen. Accordingly, if the server pixel depth is less than the predetermined value, step 155 is followed by step 157, and no further processing is performed by the server application in this regard. In the case where both the server and the client are using pseudo color pixel format, the server will inform the client of the color map used on the server to convert its pseudo color pixels for display. The client will then use this same color map to display the pseudo color pixel values received from the server. Otherwise, step 155 is followed by step 159. While in the example embodiment of FIG. 7, the test is based on a value of fifteen bits, one skilled in the art will recognize that other numbers may alternatively be suitable based on use or definition of a different lowest true color pixel depth.

At step 159, the server application periodically histograms a captured frame. For example, the captured frame is one of the series of bit maps processed in step 50 of FIG. 2. The histogram generated reflects the frequency distribution of color values in the captured frame. The server application determines a number of color value ranges having the most colors occurring within the captured frame by forming the histogram at step 50.

The histogram generated at step 159 indicating the most frequently occurring colors or color ranges is then used to generate a color ramp at step 161. The color ramp generated at step 161 is in effect a kind of "synthetic" color map, the purpose of which is to communicate to a client application using pseudo color pixel format how to convert true color format pixels received from the server application. For example, if the most frequently occurring colors in the server display are found to be clustered within a given range of color values, a color ramp is formed at step 161 including a greater number of indexed entries around those most frequently occurring colors determined at step 159. The color ramp is thus biased to provide finer granularity of color conversion in the ranges of the most frequently occurring colors. The color ramp may then be periodically transmitted to the client application.

Figure 7:
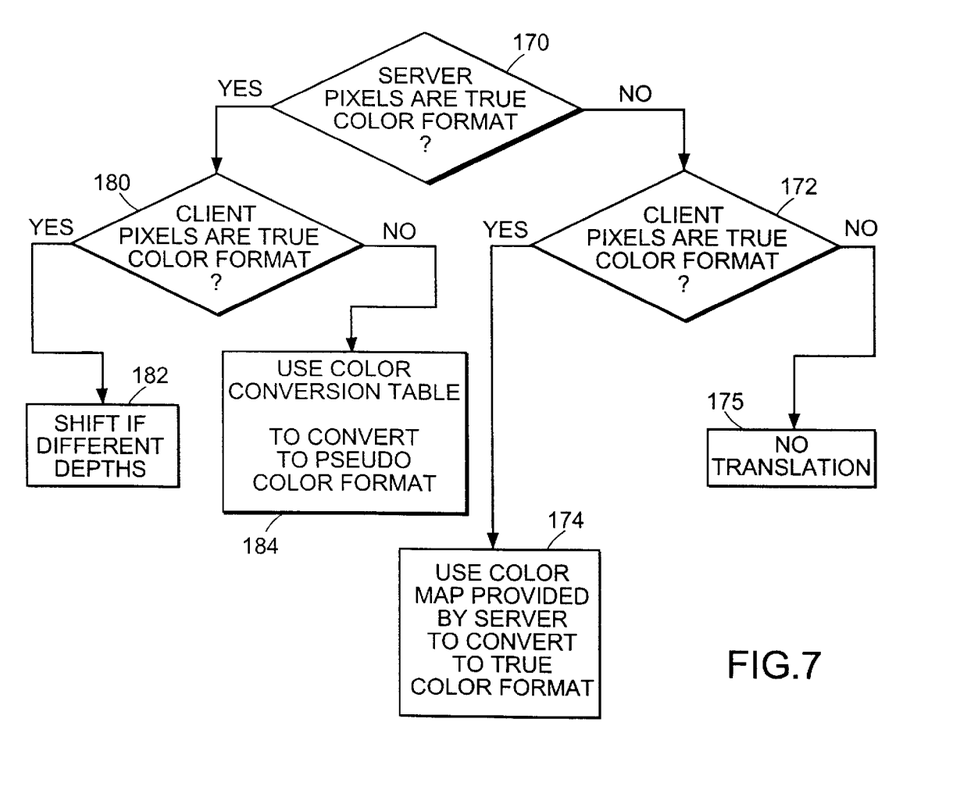
FIG. 7 is a flow chart showing steps performed in the client to process pixel values received from the server.

FIG. 7 shows steps taken in an example embodiment of the client application to process pixel values received from the server. At step 170 the client determines whether the received pixel values are in true color or pseudo color format. For example a value in a predetermined field of the received packet could indicate the pixel format. If the pixels are in true color format, step 170 is followed by step 180. If the pixels are in pseudo color format, step 170 is followed by step 172.

At step 172 the client application determines whether the client pixel display format is true color or pseudo color. If the client pixel display format is pseudo color, then step 172 is followed by step 175. At step 175, no translation of pixel values is performed, for example in an embodiment where a common pseudo color pixel depth is used between server and client. Accordingly, at step 175 the client system uses the received pseudo color pixel values to index into its local color map to obtain values to be sent to the color guns of the display device. It will be apparent to one skilled in the art that the disclosed invention would equally apply where multiple pseudo color depths are used.

At step 174, the client application uses a color map previously supplied by the server application to convert the received pseudo color pixel values into true color format for display on the client display device. The color map supplied by the server is for example the same color map used on the server system to convert pseudo color pixel values into values to be sent to the color guns on the server system.

At step 180, the client system determines whether the display on the client system uses true color or pseudo color format pixel values. If the client display uses true color pixel values, step 180 is followed by step 182. If the client display uses pseudo color pixel values, step 180 is followed by step 184.

At step 182, the client application performs any shifting that is necessary to resolve differing pixel value lengths between the true color pixel values provided by the server and the true color pixel format used by the client display system. At step 184, the client application uses a previously formed color conversion table to convert the received true color format pixel values into pseudo color format used by the client display system.

Figure 8:
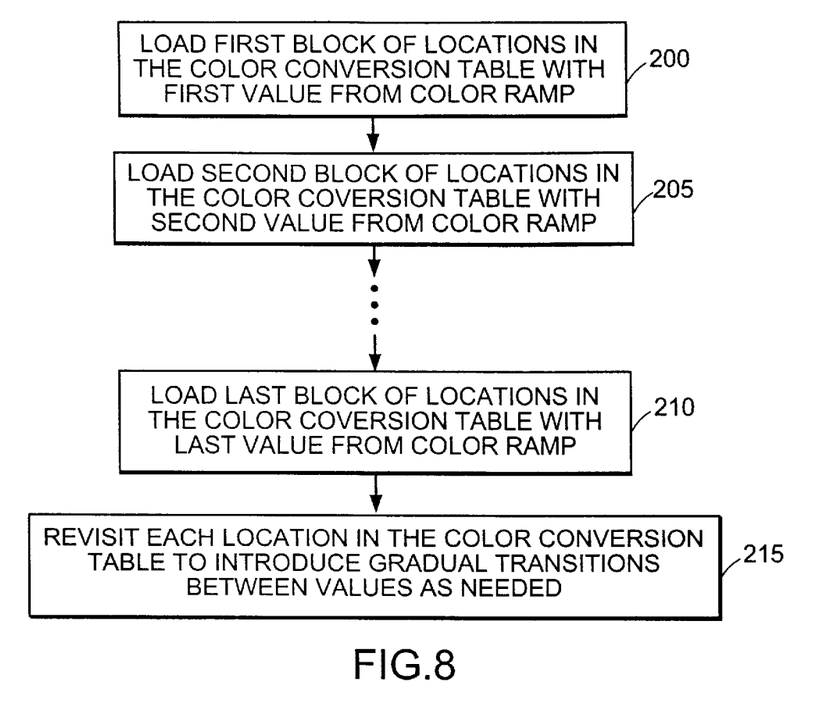
FIG. 8 is a flow chart showing an example embodiment of steps performed to generate a color conversion table.

FIG. 8 shows an example embodiment of the steps performed by the client application to form a new color conversion table as used in step 184 of FIG. 7 to convert pixel values received from the server. The steps in FIG. 8 are for example performed in response to notification by the server application of a new or modified color ramp. The color conversion table is for example formed by the client such that the table is indexed by received true color values and the values of the color conversion table are pseudo color format appropriate for the underlying client system. For example, where the true color format pixel depth of the server application window is fifteen bits, then the client application generates a 32 k byte color conversion table by forming an indexed entry for every possible value of the 15 bits. The entries in the color conversion table are loaded according to the values found in the color ramp received from the server application.

For example, those color conversion table entries having indices within a predetermined first pixel value range associated with a color ramp entry are loaded with the value found in that associated color ramp entry. For example, the size of the pixel value ranges in the color conversion table is proportionate to the number of entries in the color ramp, and accordingly the number of such pixel value ranges is the same as the number of color ramp entries. Those color conversion table entries having indices within a predetermined second pixel value range associated with a second color ramp entry are loaded with the value found in that associated color ramp entry, etc. Alternatively, where the pixel depth of the server application window is 16, 24 or 32 bits, the client application generates a color conversion table having an entry indexed by every possible 16, 24, or 32 bit pixel value respectively. In this way a color conversion table is formed for mapping the values in the provided color ramp to specific pixel values.

In an example embodiment, the color conversion table is formed such that it is indexed by only a subset of the bits in each received true color pixel value. In this way, the color conversion table size is significantly reduced in order to reduce memory utilization. This is especially important where the true color pixels are 24 bits. In the example embodiment, the color conversion table is formed having 20 bit indexes for each of its entries, resulting in a table having 1024×1024 entries. The client application then eliminates a predetermined portion of each received true color pixel value before indexing the color conversion table to obtain the appropriate pseudo color value.

Specifically with regard to step 200, the client application loads a first block of locations in the color conversion table with a first value from the color ramp received from the server application. At step 205, the client application loads a second block of locations in the conversion table with a second value from the received color ramp, and so on through step 210, at which the client application loads a last block of locations in the color conversion table with the last value from the received color ramp. A smoothing function is then performed at step 215, such that the transitions between the color ramp values loaded into the color conversion table are made more gradual. This smoothing of the color conversion table values improves the appearance of some three dimensional graphics displays.

Figure 9:
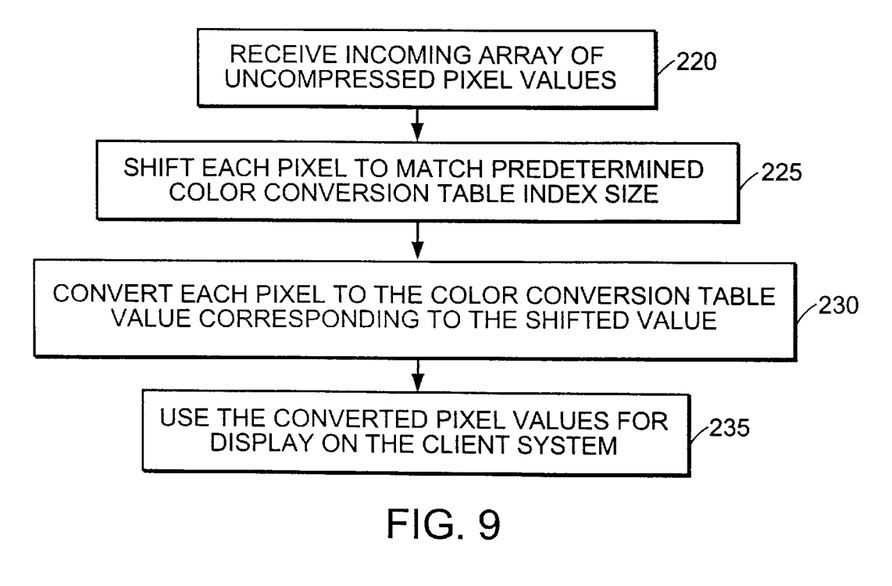
FIG. 9 is a flow chart showing an example embodiment of steps performed to convert a received array of uncompressed pixel values using a color conversion table.

FIG. 9 shows steps taken by the client application to process pixel values received from the server system at step 184 as shown in FIG. 7. At step 220, the client application receives as input an array of uncompressed pixel values, for example after any necessary decompression has been performed. At step 225, the client application shifts each pixel value to match a predetermined color conversion index size. For example, where the server application is using a 24 bit true color pixel format, the index length is 20 bits. In order to obtain the 20 bit index, the example embodiment performs a right shift of 4 bits on each 24 bit pixel value. In the example embodiment, the 4 bit shift right eliminates the 4 low order bits of true color information regarding the color blue. The color blue information can be effectively reduced in this way because humans are relatively insensitive to distinctions between shades of blue. Accordingly, the elimination of the 4 bits is relatively unimportant to the ultimate viewer of the resulting display.

At step 230, the client system converts each shifted true color value to the corresponding color conversion table value, which is equal to a pseudo color value appropriate for the client display system. At step 235 the client application uses the pseudo color values thus obtained to display the shared image on the client display device.

While the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of resolving diverse pixel formats in a bit map sharing collaborative tool, comprising the steps of:
   determining a frequency distribution of color values within pixels in a bit map of a shared display region on a server system;
   forming a color ramp responsive to said frequency distribution of color values, wherein said color ramp includes a number of color ramp entries, each one of said color ramp entries including an output color value associated with one or more input color values; and
   transmitting said color ramp to a client system.

2. The method as in claim 1, wherein said color ramp includes entries indexed by a predetermined number of the most frequently occurring color values in said frequency distribution of color values.

3. The method as in claim 1, wherein said pixels in said bit map of said shared display region on said server are true color format, and where pixels in said client system are in a pseudo color format, and wherein said color ramp includes an entry for each of a plurality of server true color values, each entry including an associated client true color value.

4. The method as in claim 1, wherein said pixels in said bit map of said shared display region on said server are of a first pseudo color format, and where pixels in said client system are of a second pseudo color format, and wherein said color ramp includes an entry for each of a plurality of server color values, each entry including an associated client color value.

5. The method as in claim 1, wherein said pixels in said bit map of said shared display region on said server are of a first true color format, and where pixels in said client system are of a second true color format, and wherein said color ramp includes an entry for each of a plurality of server color values, each entry including an associated client color value.

6. The method of claim 1, further comprising:
   receiving said color ramp in a client system;
   forming a color conversion table based on the contents of said color ramp;
   converting pixel information received from said server using said color conversion table in said client system.

7. The method of claim 6 wherein said color conversion table is formed by said client system.

8. The method of claim 6, wherein said step of forming said color conversion table further comprises loading a first block of locations in said color conversion table with corresponding values from said color ramp.

9. The method of claim 8, wherein said step of forming said color conversion table such that a plurality of entries corresponding to shades of a first color are omitted in order to conserve memory space.

10. The method of claim 9, wherein said first color is blue.

11. The method of claim 9, further comprising shifting pixel values prior to indexing into said color conversion table, said shift eliminating a portion of information regarding said first color from said received pixel values.

12. The method of claim 11, wherein said shift is performed by said client system.

13. A system for resolving diverse pixel formats in a bit map sharing collaborative tool, comprising:
   means for determining a frequency distribution of color values within pixels in a bit map of a shared display region on a server system;
   means for forming a color ramp responsive to said frequency distribution of color values, wherein said color ramp includes a number of color ramp entries, each one of said color ramp entries including an output color value associated with one or more input color values; and
   means for transmitting said color ramp to a client system.

14. The system as in claim 13, wherein said color ramp includes entries indexed by a predetermined number of the most frequently occurring color values in said frequency distribution of color values.

15. The system as in claim 13, wherein said pixels in said bit map of said shared display region on said server are true color format, and where pixels in said client system are in a pseudo color format, and wherein said color ramp includes an entry for each of a plurality of server true color values, each entry including an associated client true color value.

16. The system as in claim 13, wherein said pixels in said bit map of said shared display region on said server are of a first pseudo color format, and where pixels in said client system are of a second pseudo color format, and wherein said color ramp includes an entry for each of a plurality of server color values, each entry including an associated client color value.

17. The system as in claim 13, wherein said pixels in said bit map of said shared display region on said server are of a first true color format, and where pixels in said client system are of a second true color format, and wherein said color ramp includes an entry for each of a plurality of server color values, each entry including an associated client color value.

18. The system of claim 13, further comprising:
   means for receiving said color ramp in a client system;
   means for forming a color conversion table based on the contents of said color ramp;
   means for converting pixel information received from said server using said color conversion table in said client system.

19. The system of claim 18 wherein said color conversion table is formed by said client system.

20. The system of claim 18, wherein said means for forming said color conversion table further comprises loading a first block of locations in said color conversion table with corresponding values from said color ramp.

21. The system of claim 20, wherein said means for forming said color conversion table operates such that a plurality of entries corresponding to shades of a first color are omitted in order to conserve memory space.

22. The system of claim 21, wherein said first color is blue.

23. The system of claim 21, further comprising means for shifting pixel values prior to indexing into said color conversion table, said shift eliminating a portion of information regarding said first color from said received pixel values.

24. The system of claim 23, wherein said shift is performed by said client system.

25. A computer readable program storage device, having computer executable instructions encoded thereon, said computer executable instructions comprising program code for resolving diverse pixel formats in a bit map sharing collaborative tool, said program code comprising:
   program code for determining a frequency distribution of color values within pixels in a bit map of a shared display region on a server system;
   program code for forming a color ramp responsive to said frequency distribution of color values, wherein said color ramp includes a number of color ramp entries, each one of said color ramp entries including an output color value associated with one or more input color values; and
   program code for transmitting said color ramp to a client system.

26. The computer readable program storage device as in claim 25, wherein said color ramp includes entries indexed by a predetermined number of the most frequently occurring color values in said frequency distribution of color values.

27. The computer readable program storage device as in claim 25, wherein said pixels in said bit map of said shared display region on said server are true color format, and where pixels in said client system are in a pseudo color format, and wherein said color ramp includes an entry for each of a plurality of server true color values, each entry including an associated client true color value.

28. The computer readable program storage device as in claim 25, wherein said pixels in said bit map of said shared display region on said server are of a first pseudo color format, and where pixels in said client system are of a second pseudo color format, and wherein said color ramp includes an entry for each of a plurality of server color values, each entry including an associated client color value.

29. The computer readable program storage device as in claim 25, wherein said pixels in said bit map of said shared display region on said server are of a first true color format, and where pixels in said client system are of a second true color format, and wherein said color ramp includes an entry for each of a plurality of server color values, each entry including an associated client color value.

30. The computer readable program storage device of claim 25, further comprising:
   program code for receiving said color ramp in a client system;
   program code for forming a color conversion table based on the contents of said color ramp;
   program code for converting pixel information received from said server using said color conversion table in said client system.

31. The computer readable program storage device of claim 30 wherein said color conversion table is formed by said client system.

32. The computer readable program storage device of claim 30, wherein said program code for forming said color conversion table further comprises program code for loading a first block of locations in said color conversion table with corresponding values from said color ramp.

33. The computer readable program storage device of claim 32, wherein said program code for forming said color conversion table operates such that a plurality of entries corresponding to shades of a first color are omitted in order to conserve memory space.

34. The computer readable program storage device of claim 33, wherein said first color is blue.

35. The computer readable program storage device of claim 34, further comprising program code for shifting pixel values prior to indexing into said color conversion table, said shift eliminating a portion of information regarding said first color from said received pixel values.

36. The computer readable program storage device of claim 35, wherein said shift is performed by said client system.

37. The computer readable program storage device of claim 25, wherein said computer program readable storage device is a magnetic disk ("floppy disk").

38. The computer readable program storage device of claim 25, wherein said computer readable program storage device is a computer memory.

39. The computer readable program storage device of claim 25, wherein said computer readable program storage device is an optical disk.

* * * * *